(12) United States Patent
Kaneda

(10) Patent No.: US 6,885,778 B2
(45) Date of Patent: Apr. 26, 2005

(54) IMAGE PROCESSING METHOD AND APPARATUS AND STORAGE MEDIUM

(75) Inventor: Kitahiro Kaneda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 626 days.

(21) Appl. No.: 09/899,283

(22) Filed: Jul. 6, 2001

(65) Prior Publication Data

US 2002/0003909 A1 Jan. 10, 2002

(30) Foreign Application Priority Data

Jul. 7, 2000 (JP) ........................................ 2000-207087

(51) Int. Cl.⁷ ............................ G06K 9/32; G06T 3/20
(52) U.S. Cl. ...................................... 382/294; 382/295
(58) Field of Search ................................ 382/278, 291, 382/289, 217–219, 209, 293–296, 181, 287

(56) References Cited

U.S. PATENT DOCUMENTS

| | | | | |
|---|---|---|---|---|
| 5,506,918 A | * | 4/1996 | Ishitani ........................ | 382/289 |
| 5,517,587 A | * | 5/1996 | Baker et al. ................. | 382/296 |
| 5,680,478 A | | 10/1997 | Wang et al. ................. | 382/176 |
| 5,680,479 A | | 10/1997 | Wang et al. ................. | 382/176 |
| 5,822,454 A | * | 10/1998 | Rangarajan ................. | 382/180 |
| 5,854,854 A | * | 12/1998 | Cullen et al. ................ | 382/176 |
| 5,870,508 A | * | 2/1999 | Park ............................ | 382/289 |
| 5,920,658 A | | 7/1999 | Yamagata et al. .......... | 382/293 |
| 5,999,649 A | * | 12/1999 | Nicholson et al. .......... | 382/190 |

FOREIGN PATENT DOCUMENTS

JP          9-245173          9/1997 ............. G06T/7/00

* cited by examiner

*Primary Examiner*—Jon Chang
*Assistant Examiner*—Wesley Tucker
(74) *Attorney, Agent, or Firm*—Fitzpatrick, Cella, Harper & Scinto

(57) ABSTRACT

The positional offset of an image is corrected without performing any processing for the setting of a reference position with respect to a document image, e.g., the setting of markings. Pieces of information about a reference image, including a reference position, are stored in a predetermined storage unit. Information about the input image is extracted from the input image, and a target position on the input image is calculated on the basis of the extracted information. In addition, a reference image with respect to the input image is specified on the basis of the information about the input image from the predetermined storage unit. The positional offset of the target position with respect to the reference position of the specified reference image is calculated. The positional offset of the input image with respect to the reference image is corrected on the basis of the calculated positional offset amount.

10 Claims, 5 Drawing Sheets

POSITIONAL OFFSET AMOUNT = INPUT DOCUMENT ORIGIN − ORIGINAL DOCUMENT ORIGIN = (60, 60)

OCR APPLICATION POSITION = (100, 100) + POSITIONAL OFFSET AMOUNT = (160, 160)

IMAGE EXTRACTION APPLICATION POSITION = (200, 400) + POSITIONAL OFFSET AMOUNT = (260, 460)

US 6,885,778 B2

IMAGE PROCESSING METHOD AND APPARATUS AND STORAGE MEDIUM

FIELD OF THE INVENTION

The present invention relates to an image processing method and apparatus for correcting the positional offset of an input image with respect to a reference image and a storage medium.

BACKGROUND OF THE INVENTION

In the field of document processing in which a large quantity of documents are processed collectively, documents are generally processed in accordance with document images to which pieces of processing control information permanently set for the respective types of documents, i.e., information indicating specific positions of documents at which character recognition is to be performed, information indicting specific areas of documents from which information is to be extracted, and the like, are input.

In consideration of physical errors in a read mechanism and instability of paper documents themselves, it is almost impossible to read a large quantity of document images one by one accurately at the same position by using a scanner. This tendency has recently become increasingly conspicuous with an increase in the processing speed of scanners.

When processing is to be performed on the basis of permanent positional information in this situation in the above manner, a decrease in the precision of subsequent processing, e.g., character recognition, due to a positional offset is inevitable.

Conventionally, to prevent such a problem, positioning markings are formed on documents themselves to obtain the reference position of each document, and various processes are performed on the basis of the position of a predetermined processing target area relative to the reference position. Alternatively, the layout of a document itself is designed to set a large margin for a positional offset, or a high-resolution scanner is used.

The conventional document positional offset preventing method described above is subjected to strict constraints concerning document design. A high-resolution scanner leads to an increase in cost. These factors have greatly interfered with efficient document processing. Another serious problem is that it is almost impossible to apply this method to read processing systems for processing different types of documents, which tend to become mainstream.

The present invention has been made in consideration of the above problem, and has as its object to correct the positional offset of an image without performing any processing for the setting of a reference position with respect to a document image, e.g., the setting of markings.

SUMMARY OF THE INVENTION

In order to achieve the object of the present invention, for example, an image processing apparatus of the present invention has the following arrangement.

There is provided an image processing apparatus for correcting a positional offset of an input image with respect to a reference image, comprising storage means for storing information about the reference image, including a reference position, area information specifying means for obtaining information about a plurality of areas included in the input image, target position calculating means for calculating a target position on the input image on the basis of the information obtained by the area information specifying means, calculating means for specifying information about the reference image in accordance with the input image on the basis of information from the storage means, and calculating a positional offset between the reference position included in the specified information and the target position, and correcting means for correcting positions of a plurality of areas included in the input image by using the offset calculated by the calculating means.

In addition, the target position calculating means obtains a leftmost end/uppermost end position of a plurality of areas included in the input image and sets the position as the target position.

Furthermore, the target position calculating means further comprises removing means for removing an unstable area from a plurality of areas included in the input image, and calculates a target position for the input image by using areas left after area removal performed by the removing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
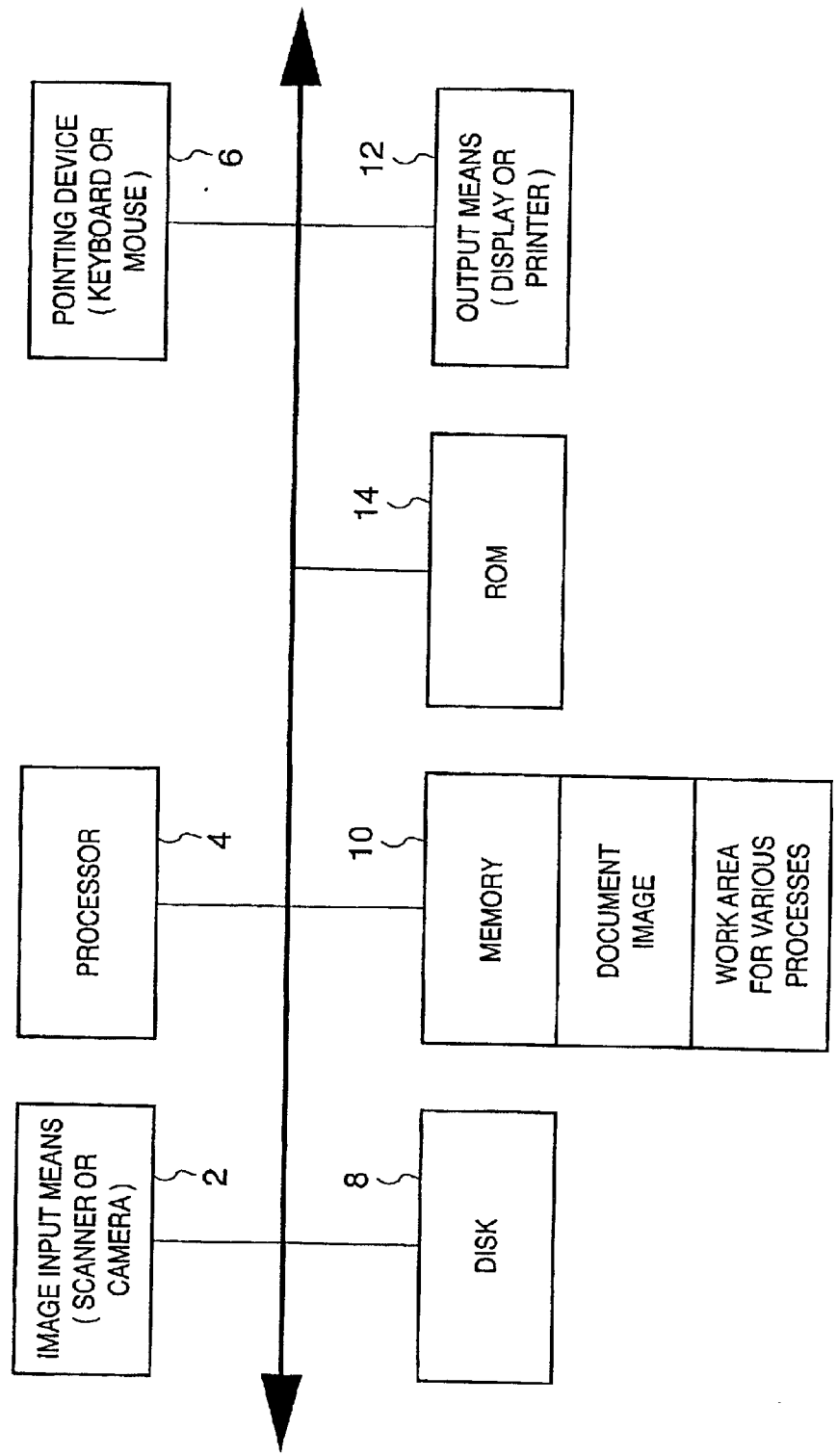
FIG. 1 is a block diagram showing the schematic arrangement of an image processing apparatus according to the first embodiment of the present invention.

FIG. 1 is a view showing the schematic arrangement of an image processing apparatus according to the first embodiment, which performs document processing to be described later.

Reference numeral 2 denotes an image input means such as a scanner, camera, or file reading unit which inputs a document image; 4, a processor for performing document processing to be described later; 6, a pointing device such as a keyboard or mouse which inputs instructions to the processor 4; 8, a disk for storing reference data for document recognition or processing control information unique to a document; 10, a memory in which the processor 4 temporarily stores document processing data or the document image read by the image input means 2 is stored; 12, an output means such as a display or printer which outputs a processing result; and 14, a ROM storing program codes by which the processor 4 executes various processes.

The operation of the image processing apparatus in this embodiment having the above arrangement will be described next. First of all, in accordance with the instructions input from the pointing device 6, the document image converted into an electronic form by the image input means 2 is acquired and bitmapped in the memory 10. The bitmapped document image is subjected to area identification in the processor 4. Thereafter, document recognition, positional offset detection, and various document processes (character recognition and the like) are performed for the document image. The processing result is output through the output means 12 such as a display or printer.

Various control processes executed by the image processing apparatus of this embodiment, and more specifically, the processor 4 will be described with reference to FIGS. 2 and 3.

Figure 2:
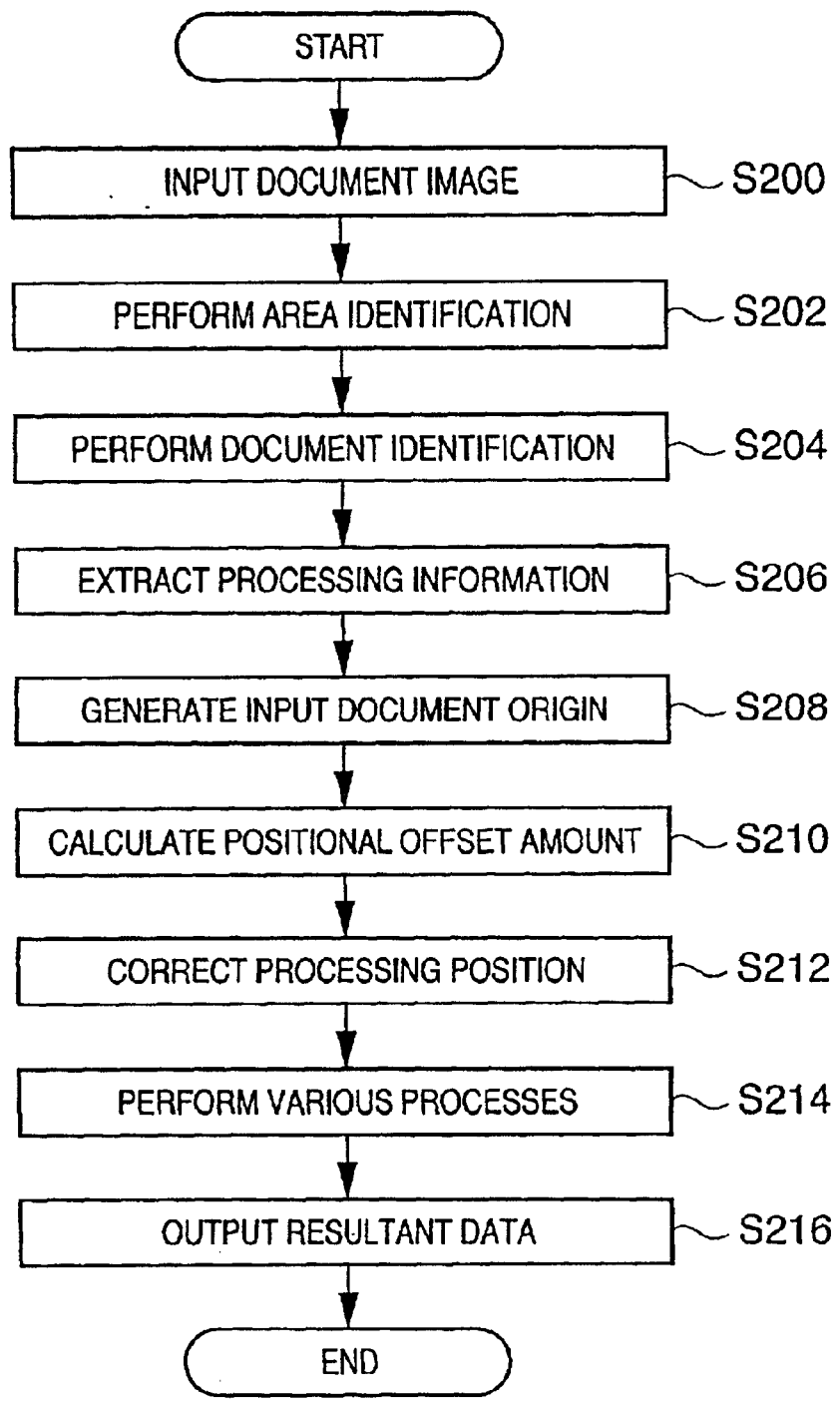
FIG. 2 is a flow chart for a case where a processor 4 processes one document.

FIG. 2 is a flow chart for a case where the processor 4 processes one document. The program codes conforming to the flow chart of FIG. 2 are stored in the ROM 14 and are read out and executed by the processor 4. With this operation, the image processing apparatus of this embodiment executes each process to be described later.

In step S200, the processor 4 receives a document image from the image input means 2 and transfers it as image data to the memory 10.

In step S202, the processor 4 performs area identification of the document image bitmapped in the memory 10 in step S200. This operation can be implemented by applying the block selection technique and the like disclosed in, for example, Japanese Patent Laid-Open No. 6-068301. In this operation, an area (block) having the same attribute on the document is extracted in accordance with the input image information, and area identification information such as an attribute, size, and position is specified.

In step S204, document identification is performed to identify the input document on the basis of the area identification information extracted in step S202.

In step S206, processing control information (including an original document origin) unique to the document identified in step S204 is extracted from a database in the disk 8, and transferred to the memory 10.

In step S208, an input document origin is generated from the area identification information extracted in step S202.

In step S210, the processor 4 calculates the amount of positional offset (document offset) between the input document origin obtained in step S208 and the original document origin transferred into the memory 10 in step S206.

In step S212, the processor 4 corrects the positional information of the target area in the processing control information of the original document by using the positional offset amount calculated in step S210.

Steps S210 and S212 will be described in detail later.

In step S214, the processor 4 performs various processes such as character recognition on the basis of the positional information of the target area of the document corrected in step S212. Specific instructions for such processes are stored in the processing control information.

In step S216, the output means 12 outputs the results obtained by the processes performed in step S214.

Figure 3:
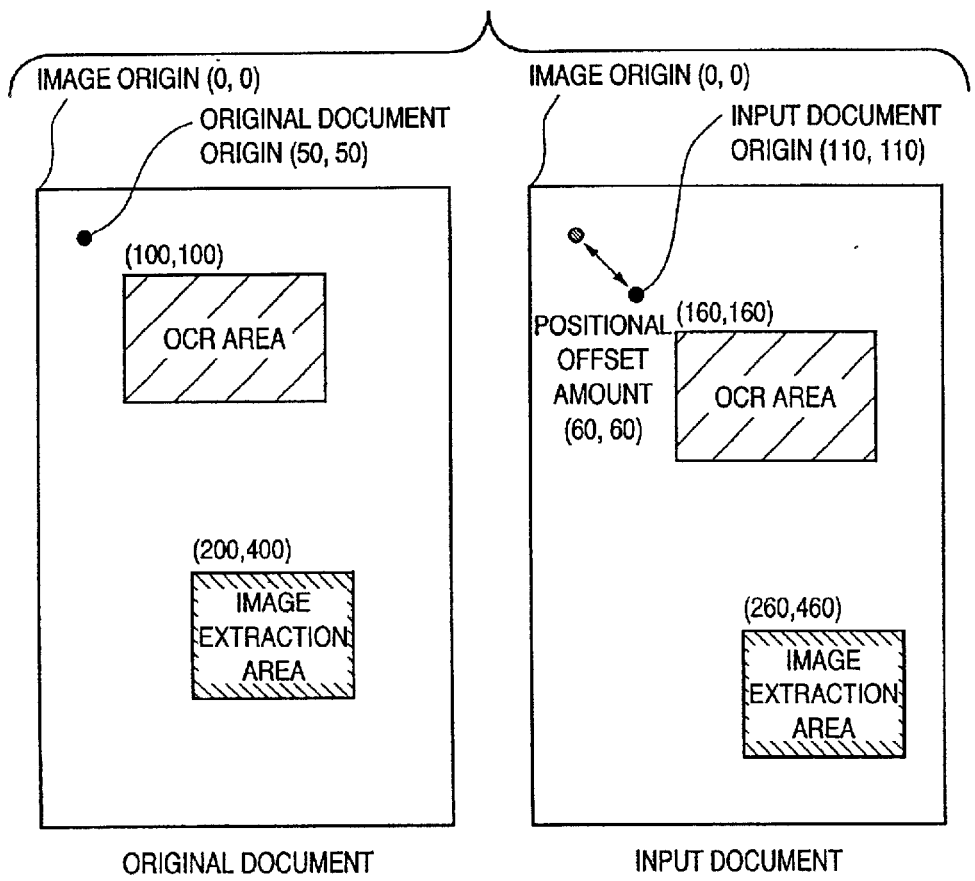
FIG. 3 is a view for explaining the step of calculating an positional offset amount in the processor 4 and the step of correcting a processing position.

FIG. 3 is a view for explaining the step of calculating a positional offset amount in the processor 4 in step S210 and the step of performing processing position correction in step S212.

The left side of FIG. 3 shows the state of an image when an original document is registered in the above database. When the image to be registered is read, area identification is performed for the read image. In the state indicated by the left side of FIG. 3, an OCR area and image extraction area are identified and acquired as area identification information. An original document origin is then determined by using this area identification information. In this embodiment, referring to FIG. 3, the original document origin is set to (50, 50) in the same manner as the processing contents in step S208. This original document origin is registered as processing control information of the corresponding document in the above database, together with an OCR application position (100, 100) in the OCR area in FIG. 3 and an image extraction position (200, 400) in the image extraction area. In addition, in the case of this document, the size of the OCR area, a character recognition processing instruction, the size of the image extraction area, and an extraction instruction are also registered as processing control information in the database.

The right side of FIG. 3 shows an example of the state where a document to be processed is input. When the document to be processed is input, area identification is performed to identify an OCR area and image extraction area (step S202), and the input document is identified (step S204). An input document origin is then generated by using the area identification information acquired by area identification (step S208). When this input document origin is compared with the original document origin read out in step S206, the occurrence of a positional offset between the image obtained when the original document is registered in the database and the read position can be detected from the offset between the original document origin position shown on the left side of FIG. 3 and the input document origin position shown on the right side of FIG. 3 (step S210).

In the step (step S210) of calculating a positional offset amount in the processor 4 with respect to this offset amount, the positional offset amount is obtained by subtracting the original document origin from the input document origin obtained in step S208 as indicated by the lower portion of FIG. 3. In the processing position correction step (step S212), the positional offset amount is added to the OCR application position coordinates and image extraction position coordinates, thereby obtaining a more accurate processing application position (the OCR position (160, 160) and image extraction position (260, 460)).

As described above, in the image processing method and apparatus according to this embodiment, even in batch processing of different types of documents, the amount of positional offset caused between an original document and an input document can be calculated by extracting universal features unique to a document and determining a document origin without relying on markings or the like in setting a reference position for document offset correction. This makes it possible to correct the document positional offset.

Second Embodiment

In the first embodiment, a document origin is set at an upper left position on a document. The present invention is not limited to this. For example, a document origin may be set at a lower right position or to the barycentric average of objects.

Third Embodiment

In this first embodiment, as processes in a document, character recognition and image extraction are used.

However, the present invention is not limited to this. Obviously, the processes include any instructions associated with document processing, e.g., an image compression instruction, summarizing instruction, translation instruction, read-aloud instruction, and seal-impression collation instruction.

Fourth Embodiment

In this embodiment, an example of the step of calculating a document origin (original document origin and input document origin) in the first embodiment will be described.

Figure 4:
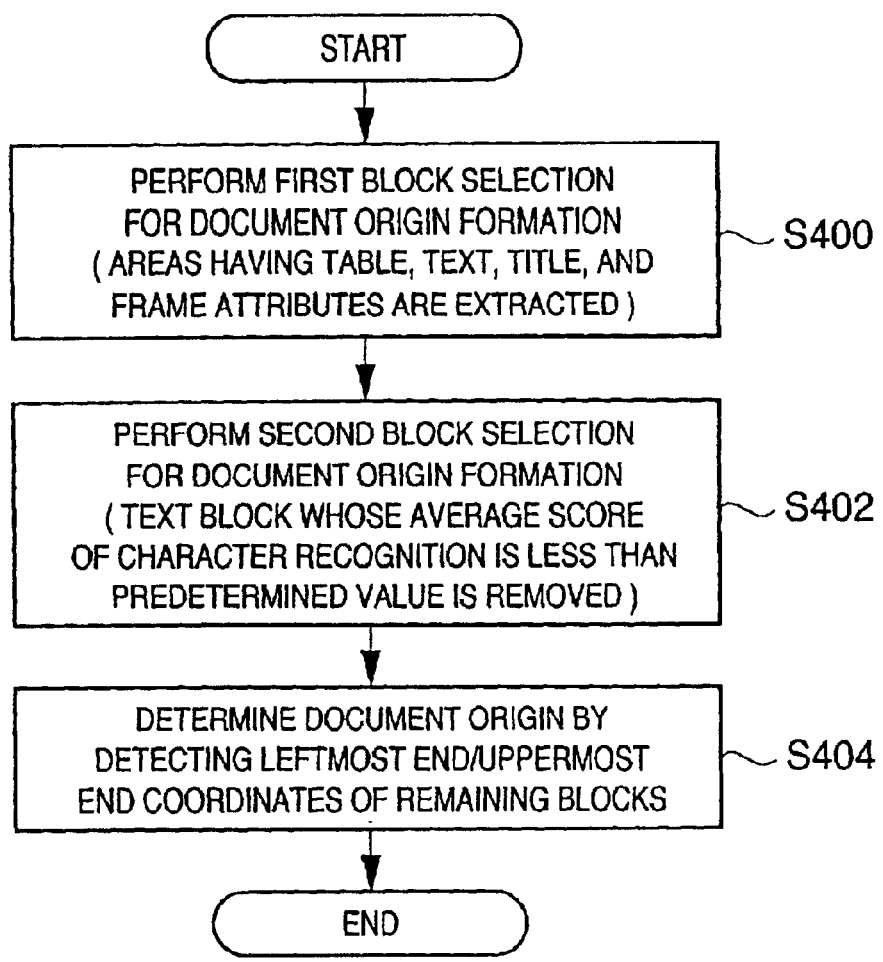
FIG. 4 is a flow chart showing a procedure for calculating a document origin.

FIG. 4 is a flow chart showing the above processing. This processing will be described below with reference to this flow chart.

In step S400, as blocks for the formation of a document origin from area identification information, blocks having a table attribute, text attribute, title attribute, and frame attribute are selected. As a result, in the document image, block areas having the respective attributes can be specified, as shown in FIG. 5A.

In step S402, unstable blocks (text blocks containing noise in this embodiment) are removed from the block areas selected in step S400. In this case, for example, character recognition is performed for each of the respective text blocks selected in step S400, and only blocks whose average scores are equal to or more than a predetermined value are left as text blocks for the formation of a document origin. More specifically, this operation is performed to remove a noise area itself or a text block including a noise area because it degrades the document origin formation precision. FIG. 5B shows the resultant document image.

Figure 5C:
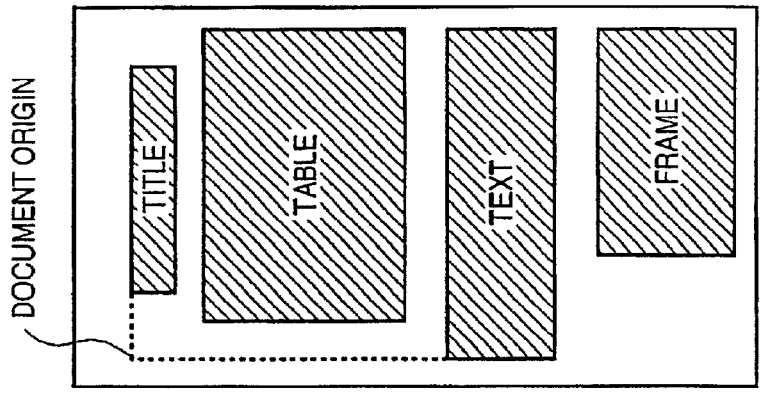
FIG. 5C is a view for explaining block selection.
Figure 5B:
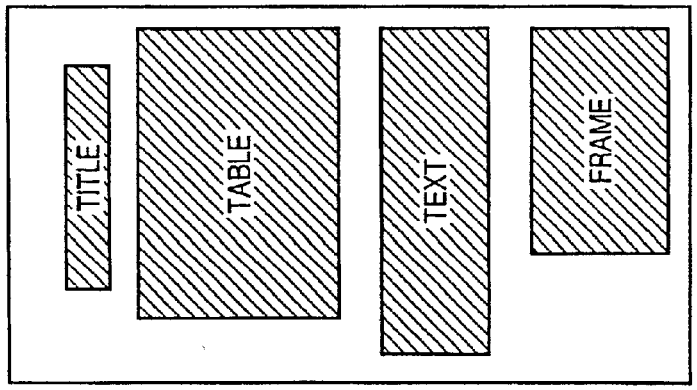
FIG. 5B is a view for explaining block selection.
Figure 5A:
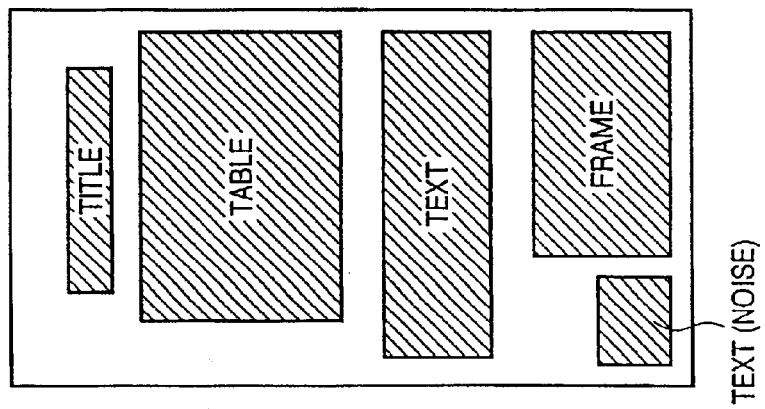
FIG. 5A is a view for explaining block selection.

In step S404, the coordinates of the leftmost end and uppermost end of the block areas finally left after selection in steps S400 and S402 are obtained to determine a document origin (FIG. 5C).

A document origin can be calculated by the above method.

In step S404, the leftmost end and uppermost end coordinates are obtained from the remaining block areas. However, the rightmost end coordinates or lowermost end coordinates may be obtained.

Fifth Embodiment

In the fourth embodiment, in step S400, areas having text, title, frame, and table attributes as block attributes are selected. The present invention is not limited to this. For example, only areas having table and frame attributes or text and title attributes may be selected. That is, any combination of attributes can be set, and any block attributes can be set as long as they represent features of a document (cells in a table and the like).

Sixth Embodiment

In the fourth embodiment, in step S402, an average score of character recognition is used as a criterion for the removal of unstable areas. However, the present invention is not limited to this. For example, small character sizes or text area positions may be used as criteria.

Other Embodiment

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is to be applied to the above storage medium, program codes corresponding to the flow charts (shown in FIG. 2 and/or FIG. 4) descried above are stored in the storage medium.

As has been described above, according to the present invention, the positional offset of an image can be corrected without performing any processing for the setting of a reference position with respect to a document image, e.g., the setting of markings. This makes it possible to reduce the load imposed on the user in performing the correction processing as compared with the prior art.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for correcting the positional offset between an input image and a reference image, comprising:

storage means for storing information about the reference image, including a reference position;

area information specifying means for obtaining information about a plurality of areas included in the input image, the information including left end coordinates and upper end coordinates of the plurality of areas;

target position setting means for obtaining a leftmost end coordinate from among the left end coordinates of the plurality of areas included in the information obtained by said area information specifying means, obtaining an uppermost end coordinate from among the upper end coordinates of the plurality of areas, and setting the obtained leftmost end coordinate and the uppermost end coordinate as a target position;

calculating means for specifying information about the reference image in accordance with the input image from said storage means, and calculating the positional offset between the reference position included in the specified information and the target position set by said target position setting means; and correcting means for correcting positions of a plurality of areas included in the input image by using the positional offset calculated by said calculating means.

2. The apparatus according to claim 1, wherein said area information specifying means extracts the plurality of areas based on attributes from the input image, and specifies information including attributes, sizes, and positional coordinates of the plurality of areas.

3. The apparatus according to claim 2, wherein the attributes include a table attribute, text attribute, title attribute, and frame attribute.

4. The apparatus according to claim 1, wherein said target position setting means further comprises removing means for removing an unstable area from a plurality of areas included in the input image, and calculates the target position for the input image by using areas left after area removal is performed by said removing means.

5. The apparatus according to claim 4, wherein the unstable area is a noise area.

6. The apparatus according to claim 4, wherein said removing means removes an area having a score less than a predetermined score from the plurality of areas included in the input image.

7. An image processing method of correcting a positional offset between an input image and a reference image, comprising:

an area information specifying step, of obtaining information about a plurality of areas included in the input image, the information including left end coordinates and upper end coordinates of the plurality of areas;

a target position setting step, of obtaining a leftmost end coordinate from among the left end coordinates of the plurality of areas included in the information obtained in said area information specifying step, obtaining an uppermost end coordinate from among the upper end coordinates of the plurality of areas, and setting the obtained leftmost end coordinate and the uppermost end coordinate as a target position;

a calculating step, of specifying information about the reference image, the information, being stored with a reference position in storage means in accordance with the input image from the storage means, and calculating a positional offset between the reference position included in the specified information and the target position set in said target position setting step; and a correcting step, of correcting positions of a plurality of areas included in the input image by using the positional offset calculated in said calculating step.

8. The method according to claim 7, wherein said target position setting step further comprises a removing step of removing an unstable area from a plurality of areas included in the input image, and the target position for the input image is calculated by using areas left after area removal is performed in the removing step.

9. A computer-readable storage medium storing program codes for executing an image processing method of correcting a positional offset between an input image and a reference image, comprising:

a program code of an area information specifying step, of obtaining information about a plurality of areas included in the input image, the information including left end coordinates and upper end coordinates of the plurality of areas;

a program code of a target position setting step, of obtaining a leftmost end coordinate from among the left end coordinates of the plurality of areas included in the information obtained in the area information specifying step, obtaining an uppermost end coordinate from among the upper end coordinates of the plurality of areas, and setting the obtained leftmost end coordinate and the uppermost end coordinate as a target position;

a program code of a calculating step, of specifying information about the reference image, the information being stored with a reference position in storage means in accordance with the input image from the storage means, and calculating a positional offset between the reference position included in the specified information and the target position set in the target position setting step; and a program code of a correcting step, of correcting positions of a plurality of areas included in the input image by using the positional offset calculated in the calculating step.

10. The medium according to claim 9, wherein the target position setting step further comprises a removing step of removing an unstable area from a plurality of areas included in the input image, and the target position for the input image is calculated by using areas left after area removal is performed in the removing step.

* * * * *

UNITED STATES PATENT AND TRADEMARK OFFICE
CERTIFICATE OF CORRECTION

PATENT NO. : 6,885,778 B2
DATED : April 26, 2005
INVENTOR(S) : Kaneda

It is certified that error appears in the above-identified patent and that said Letters Patent is hereby corrected as shown below:

Column 7,
Line 37, "information," should read -- information --.

Signed and Sealed this

Tenth Day of January, 2006

JON W. DUDAS
*Director of the United States Patent and Trademark Office*